United States Patent [19]

Erickson et al.

[11] Patent Number: 4,946,068

[45] Date of Patent: Aug. 7, 1990

[54] FRESH CATALYST CONTAINER

[75] Inventors: Michael E. Erickson, Country Club Hills; Roman T. Plichta, Naperville, both of Ill.

[73] Assignee: Amoco Corporation, Chicago, Ill.

[21] Appl. No.: 781,921

[22] Filed: Sep. 30, 1985

[51] Int. Cl.$^5$ .............................................. B65B 1/00
[52] U.S. Cl. .................................... 222/23; 222/462; ·220/1.5; 294/81.2
[58] Field of Search ............... 222/460, 462, 547, 556, 222/23; 220/1.5; 198/355, 351, 352; 294/81.2

[56] References Cited

U.S. PATENT DOCUMENTS

| | | | |
|---|---|---|---|
| 1,650,118 | 11/1927 | Fitch | 294/81.2 |
| 1,990,050 | 2/1935 | Schenk et al. | 198/355 X |
| 2,069,739 | 2/1937 | Fildes et al. | 222/547 X |
| 2,103,960 | 12/1937 | Spiro | 222/547 X |
| 2,919,790 | 1/1960 | Winz et al. | 198/355 X |
| 3,130,855 | 4/1964 | Gunn | 222/547 X |
| 3,144,926 | 8/1964 | Edelman | 198/355 |
| 3,224,653 | 12/1965 | Cooke | 222/547 X |
| 3,499,694 | 3/1970 | Coppel | 220/1.5 X |
| 3,711,902 | 1/1973 | Eggert | 220/1.5 X |
| 4,280,640 | 7/1981 | Daloisio | 220/1.5 X |
| 4,505,402 | 3/1985 | Gerhard | 220/1.5 |

Primary Examiner—Joseph J. Rolla
Attorney, Agent, or Firm—Thomas W. Tolpin; William H. Magidson; Ralph C. Medhurst

[57] ABSTRACT

A specially arranged fresh catalyst container is provided to effectively and efficiently transport store, and dispense fresh catalyst into a resid hydrotreating unit in an oil refinery. The fresh catalyst container is equipped with monorail- and bridge crane- grab channels to receive and be carried by the grab hooks of a monorail, as well as by the grab hooks of an overhead bridge crane. The container also has separate forklift channels to accommodate movement of the container by a forklift truck onto railway cars and flatbed trucks for transport to and from the refinery. The container has special electronic and visual indicators for indicating the type of catalyst within the closed interior of the container.

5 Claims, 8 Drawing Sheets

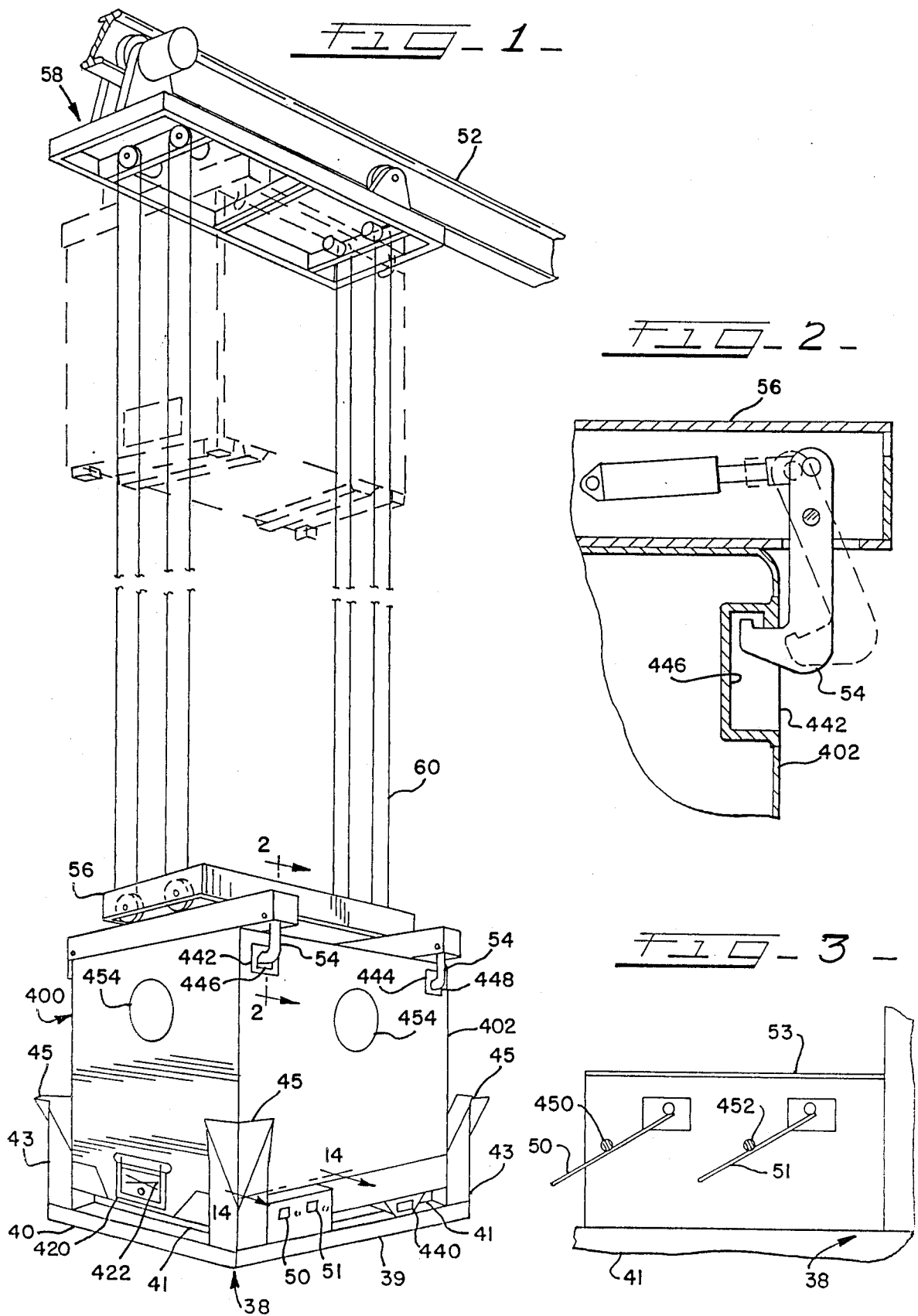

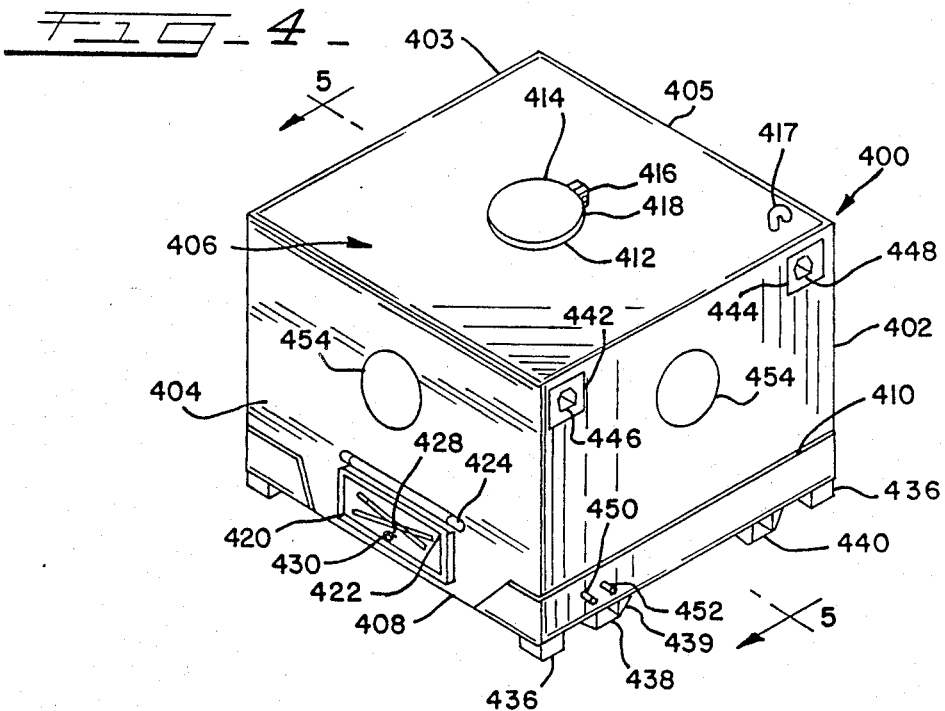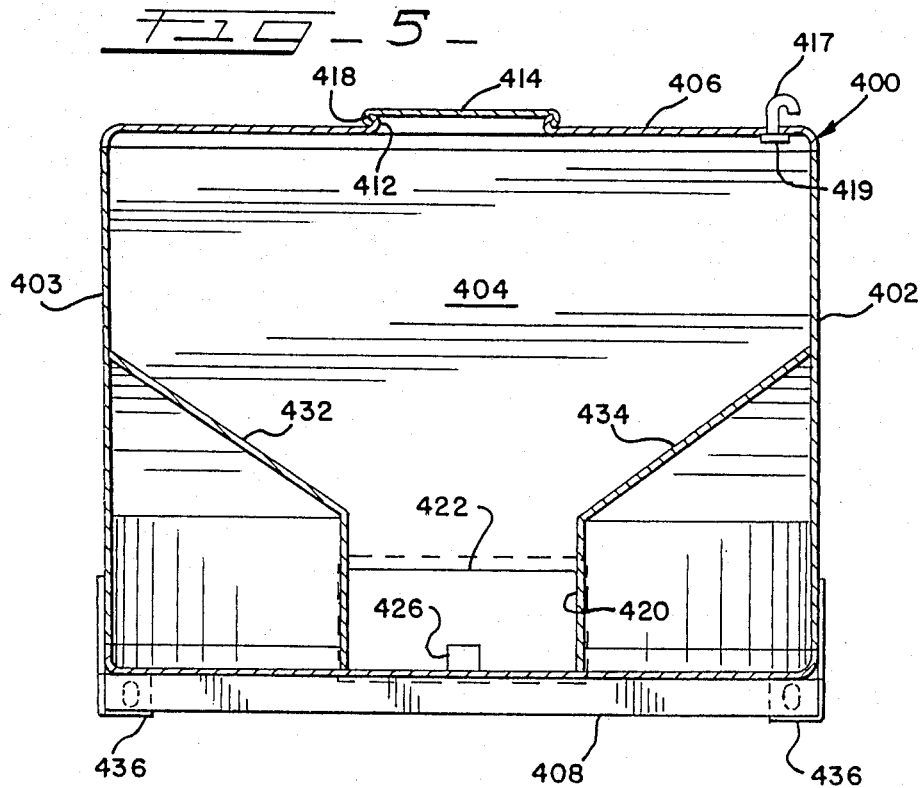

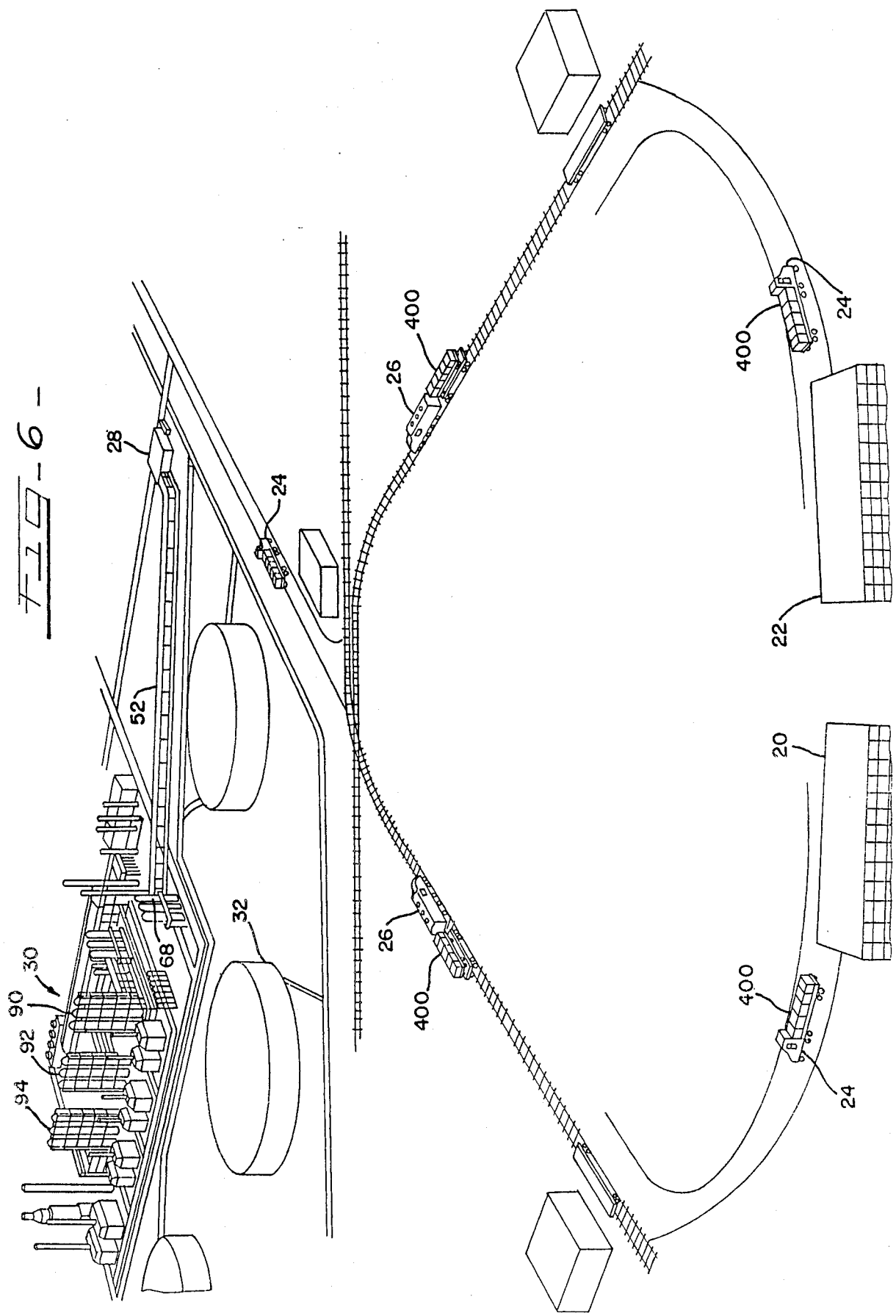

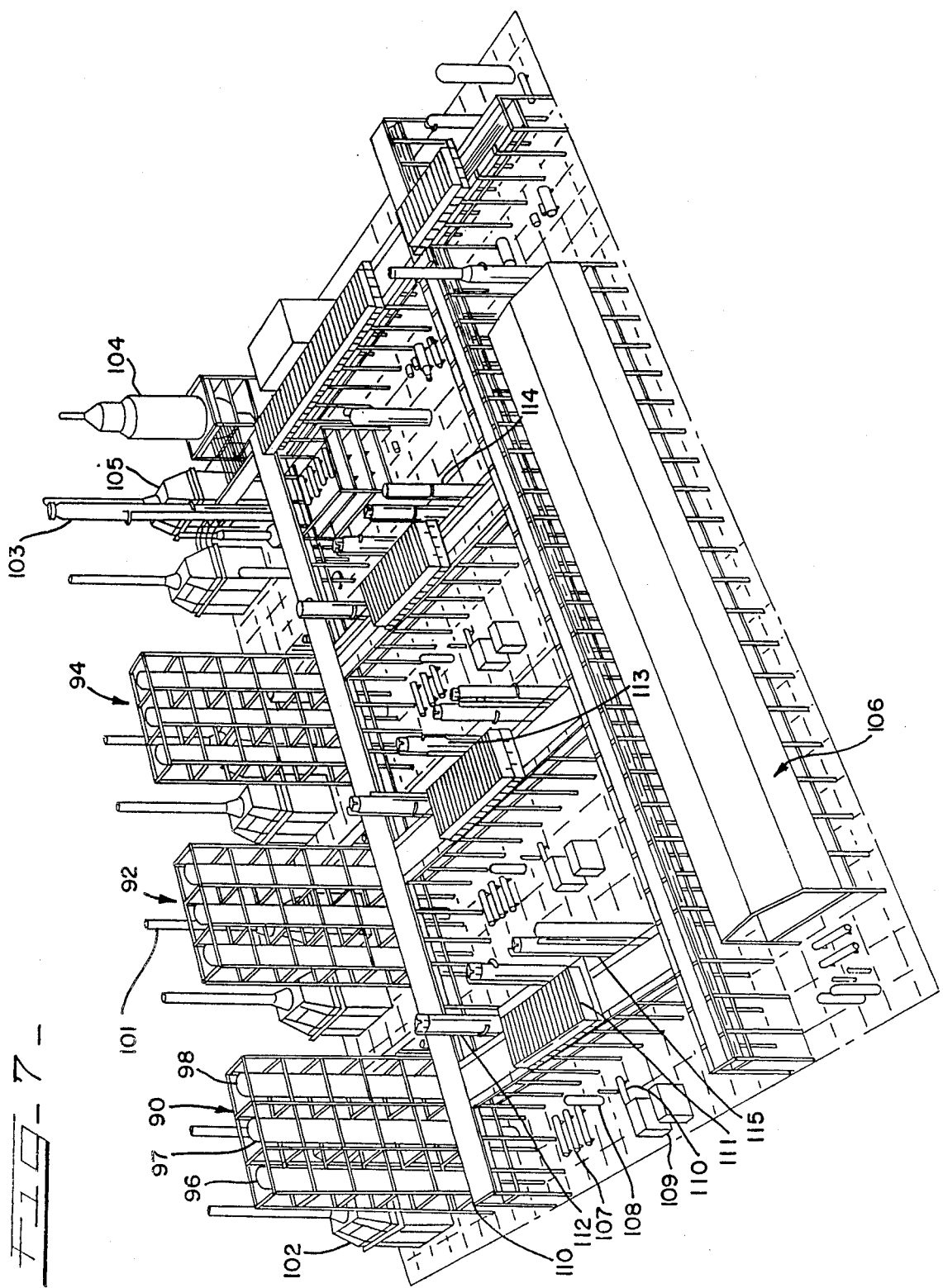

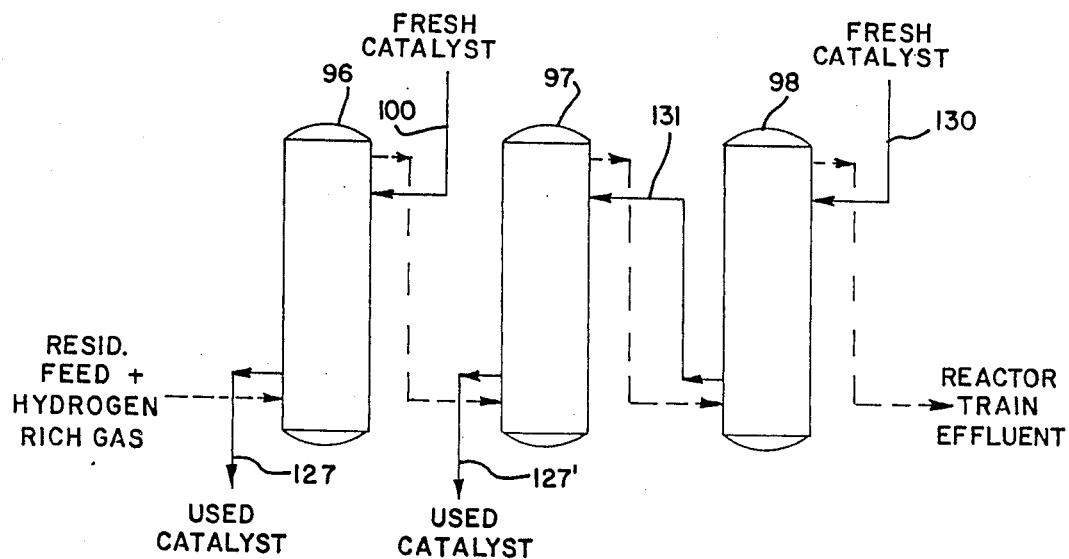
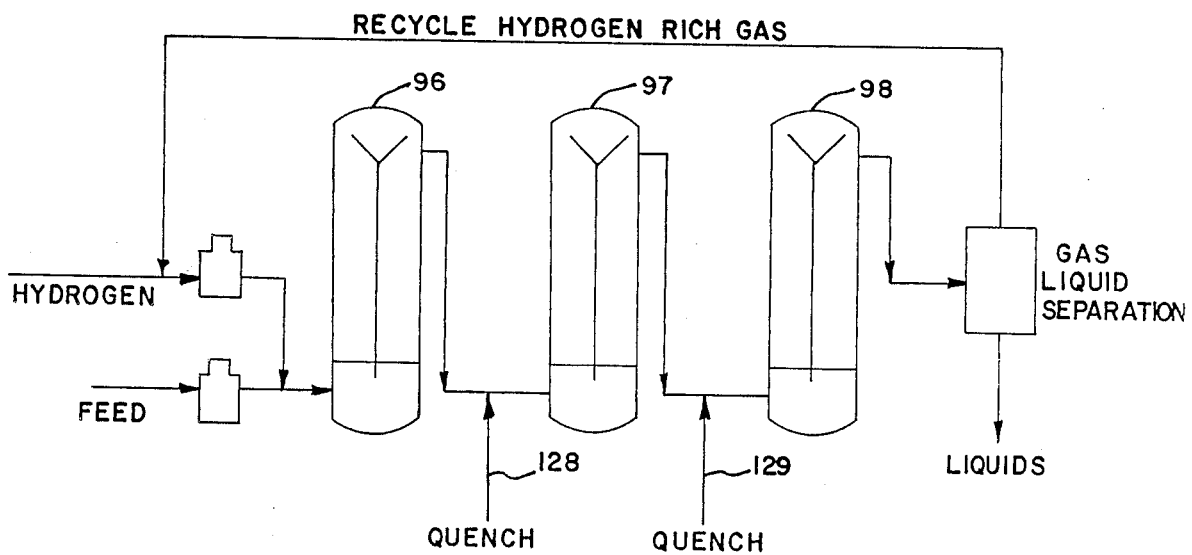

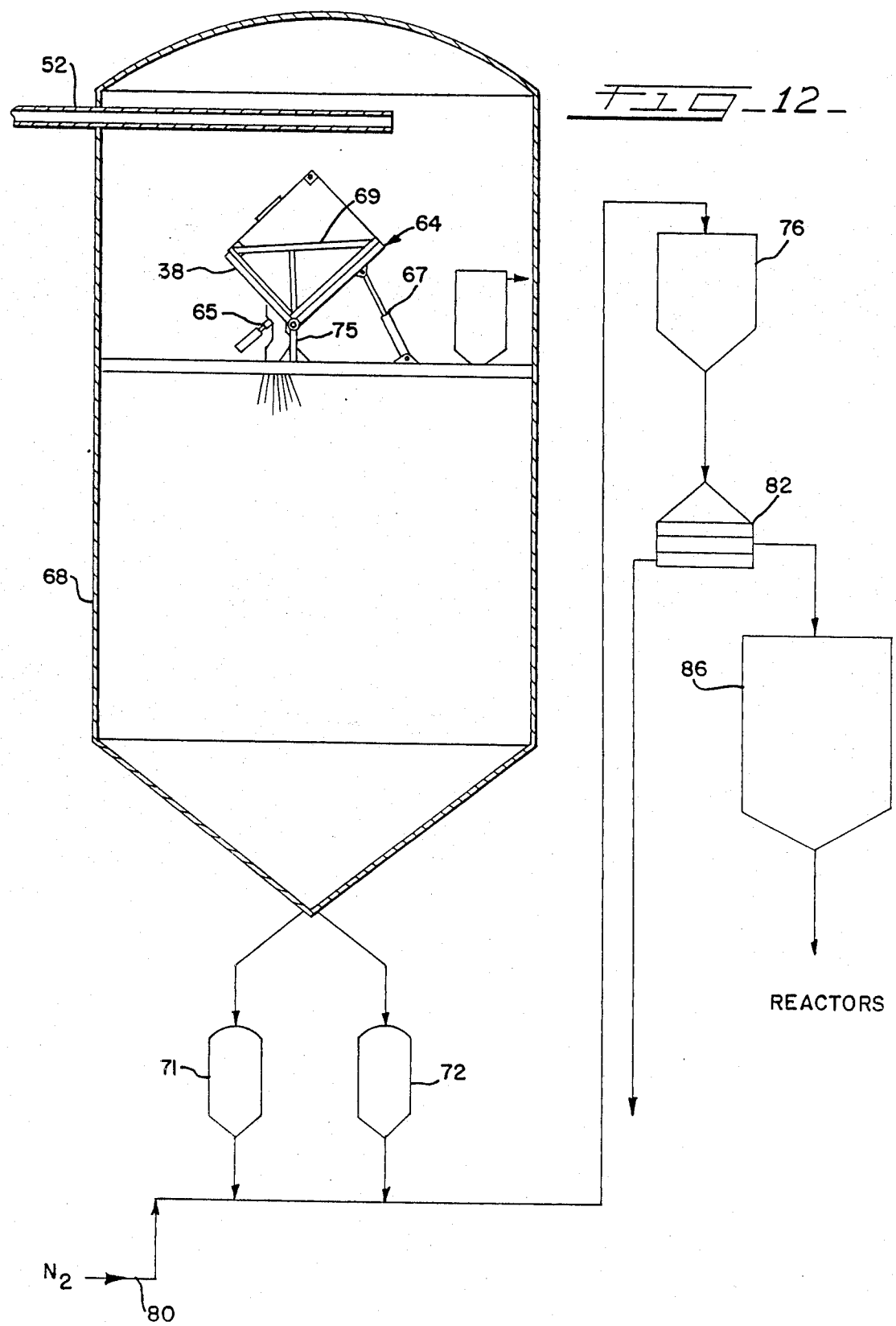

FRESH CATALYST CONTAINER

BACKGROUND OF THE INVENTION

This invention relates to materials handling devices and, more particularly, to containers for transporting, storing and dispensing fresh catalyst for a resid hydrotreating unit.

Spiraling oil costs, extensive price fluctuations, and artificial output limitations by the cartel of oil producing countries (OPEC) have created instability and uncertainty for net oil consuming countries, such as the United States, to attain adequate supplies of high quality, low-sulfur, petroleum crude oil (sweet crude) from Saudi Arabia, Nigeria, and other countries, at reasonable prices for conversion into gasoline, fuel oil, and petrochemical feedstocks. In an effort to stabilize the supply and availability of crude oil at reasonable prices, Amoco Oil Company has developed, constructed and commercialized within the past year extensive, multi-million dollar refinery projects under the second Crude Replacement Program (CRP II) to process poorer quality, high-sulfur, petroleum crude oil (sour crude) and resid to demetallate, desulfurize, and hydrocrack resid, to produce high value products, such as gasoline, distillates, catalytic cracker feed, coke, and petrochemical feedstocks. The Crude Replacement Program is of great benefit to the oil consuming nations by providing for the availability of adequate supplies of gasoline and other petroleum products at reasonable prices while protecting downstream operations of oil refining companies.

Amoco Oil Company's Crude Replacement Program advantageously utilizes ebullated expanded bed reactors for its resid hydrotreating units (RHU). In ebullated bed reactors, oil and hydrogen flow upward through a fixed amount of catalyst. The oil flows upwardly through the catalyst bed at a sufficient velocity to expand and maintain the catalyst in a state of random ebullated motion. Ebullated bed reactors were selected over fixed bed reactors because of the ebullated bed reactor's ability to economically process more types of feedstocks and to readily adapt to changes in the feedstock's composition. Ebullated bed reactors desirably accommodate the addition and the withdrawal of catalyst onstream during regular use and operations without shutting down the unit and they also minimize bed plugging.

The successful commercialization and use of ebullated bed reactors requires voluminous amounts of catalyst to be transported to and removed from the ebullated bed reactors daily. It also requires that used spent catalyst be deoiled before being shipped to a reclamation site or disposal area to protect the environment by preventing RHU reactor oil from dripping, spilling, and accumulating on the nation's highways, as well as to maximize product yield. In order to safeguard and protect the reactors and associated refinery equipment, it is desirable to restrict trucks from driving anywhere close to the reactors and associated equipment. All of the above requirements create an enormous materials handling problem.

Over the years, a variety of receptacles, drums, containers, bins, cans, boxes, dispensers, and associated equipment, have been suggested for transporting, storing, and dispensing bulk materials, such as dry solids or liquids. These receptacles usually have one or more significant customized features to accommodate the specific material stored in the receptacle and/or to accommodate handling by special types of materials handling equipment. Typifying these prior art receptacles and associated equipment are those found in U.S. Pat. Nos. 474,507, 1,285,074, 2,035,838, 2,161,988, 2,228,435, 2,293,160, 2,614,817, 2,681,746, 2,862,645, 2,929,658, 3,083,879, 3,111,242, 3,138,297, 3,162,330, 3,182,750, 3,198,395, 3,220,612, 3,224,653, 3,231,141, 3,318,486, 3,347,971, 3,407,971, 3,602,400, 3,785,534, 3,899,095, 4,027,787, 4,032,048, and 4,281,729. These receptacles and associated equipment have met with varying degrees of success.

It is, therefore, desirable to provide an improved container for handling fresh catalyst which overcomes most, if not all, of the above problems.

SUMMARY OF THE INVENTION

An improved container is provided for transporting, storing, and dispensing fresh catalyst to a resid hydrotreating unit. The container provides an effective, efficient, and impervious enclosure for containing unused fresh catalyst.

The fresh catalyst container is fabricated of catalytically resistant metal and has upright walls including substantially parallel sidewalls and substantially parallel front and back walls which extend between and connect the sidewalls. Parallel top and bottom walls extend between and connect the upright walls. In the illustrative embodiment, wear plates are secured to the upright walls to enhance the protection and structural strength of the container walls. The top wall has an inlet opening for ingress of fresh catalyst and has a lid for closing the inlet opening.

One of the sidewalls of the container has an outlet opening, preferably near the bottom of the container, for egress of the fresh catalyst when the container is tilted. A removable closure closes the outlet opening. Desirably, the closure comprises a lockable pivotable door with a releasable locking assembly connected thereto.

Monorail- and bridge crane- grab channels extend through the front and back walls to alternately receive the grab hooks of a monorail and the grab hooks of a bridge crane. Forklift channels extend across and are securely connected to the bottom of the container to receive the tines of a forklift truck so as to permit the container to be lifted onto and off of a flatbed truck trailer.

Lock-receiving assemblies extend downwardly from the bottom to matingly engage and lockingly receive lock pins of a flatbed truck trailer.

One or more indicators are operatively connected to the container to indicate the type of fresh catalyst stored in the container. The indicators preferably take the form of a demetallation catalyst-indicating pin and a desulfurization catalyst-indicating pin which cooperatively engage and trip various limit switches on an intelligence pad. The indicators can also include visual display markers.

In the preferred form, internal downwardly-sloping baffles are secured to the interior of the upright walls to deflect the fresh catalyst toward the outlet opening.

A more detailed explanation of the invention is provided in the following description and appended claims taken in conjunction with the accompanying drawings.

BRIEF DESCRIPTION OF THE DRAWINGS

FIG. 1 is a perspective view of a fresh catalyst container being grasped by portions of an overhead monorail system in accordance with principles of the present invention and showing in solid line the container in its lowered position and in dotted line the container in its raised position;

FIG. 2 is a cross-sectional view of the monorail grab channel and grab hooks taken substantially along lines 2—2 of FIG. 1;

FIG. 3 is a front view of the catalyst-indicating pins and limit switches taken substantially along lines 3—3 of FIG. 1;

FIG. 4 is a perspective view of the fresh catalyst container;

FIG. 5 is a cross-sectional view of the fresh catalyst container taken substantially along lines 5—5 of FIG. 4;

FIG. 6 is a perspective view of a catalyst handling system for transporting fresh and spent catalyst containers to and from resid hydrotreating units at a refinery;

FIG. 7 is a perspective view of the resid hydrotreating unit and associated equipment;

FIGS. 9 and 10 are schematic flow diagrams of a train of reactors;

FIG. 12 is an enlarged schematic flow diagram of a catalyst silo and container tilt mechanism as well as some other portions of the fresh catalyst handling system.

DETAILED DESCRIPTION OF THE PREFERRED EMBODIMENT

Figure 8:
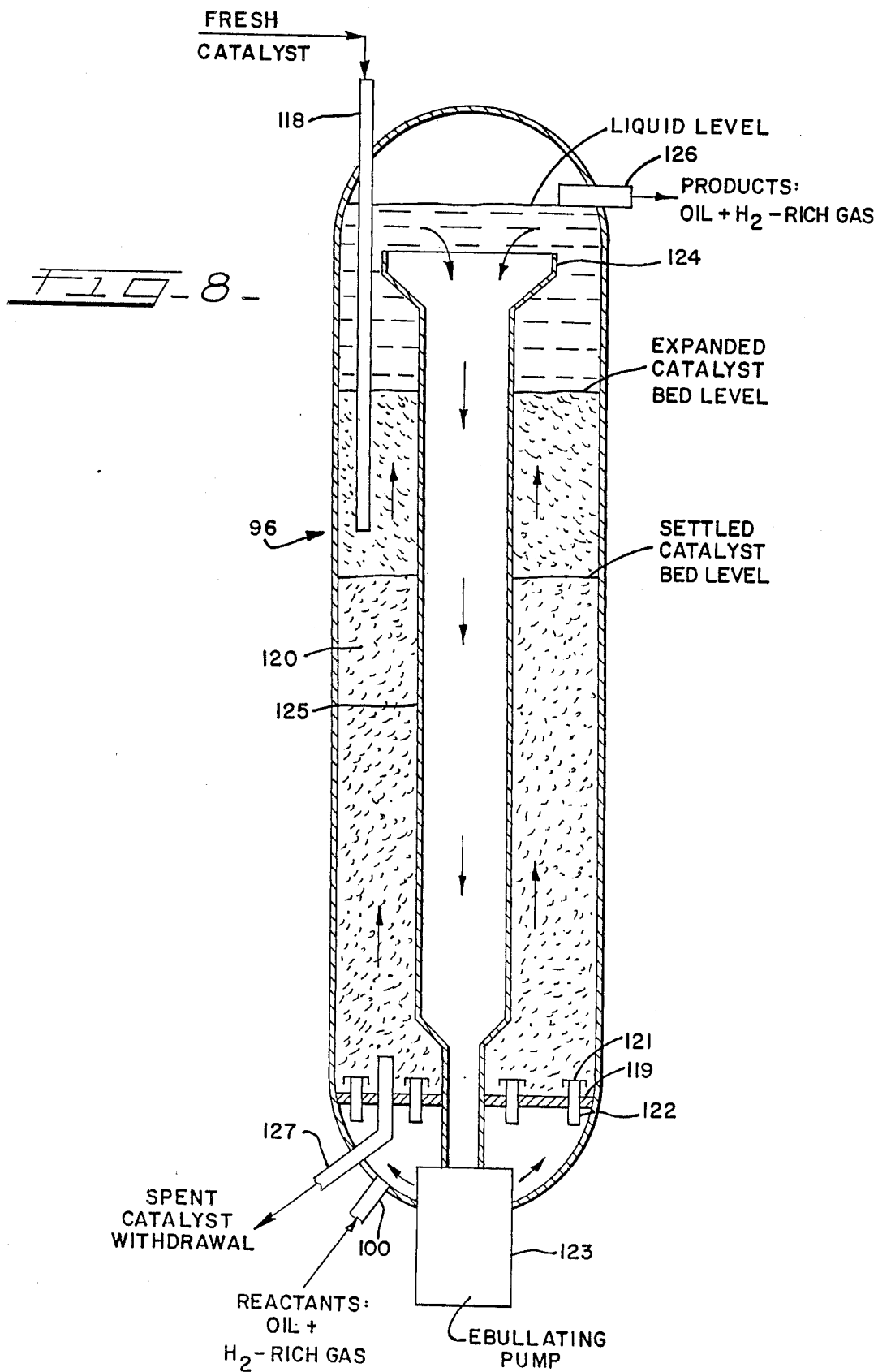
FIG. 8 is a cross-sectional view of an ebullated bed reactor.

A fresh catalyst container 400 (FIGS. 1, 4, and 6) provides a bin, receptacle and assembly for safely and effectively handling, transporting, storing, and dispensing fresh catalyst from a catalyst manufacturing facility 20 (FIG. 6) or supply house 22 to a resid hydrotreating unit 90, 92, or 94 of a refinery 30.

As best shown in FIG. 4, the fresh catalyst container 400 has rectangular, vertical upright walls 402–405 including parallel front and back rectangular, longitudinal walls 402 and 403, and parallel, lateral, rectangular sidewalls 404 and 405 extending laterally between and connecting the longitudinal walls. Rectangular, horizontal end walls 406 and 408 provide a top (top wall) and a bottom (bottom wall) which extend between and connect the upright walls. The walls are fabricated of catalytically resistant metal, such as aluminum. The end walls and the upright walls cooperate with each other to provide substantially rigid imperforate barriers as well as a substantially impervious, fluid and solid-impermable, enclosure to contain the fresh catalyst. Outwardly facing, external rectangular wear plates 410 extend along the upright walls in proximity to the bottom to reinforce and protect the upright walls. The container is symmetrical about its vertical axis.

The top 406 (FIG. 4) has a circular access opening or port 412 for input and loading of unused fresh catalyst. A circular lid 414 and drum closure provide a cover which is pivotally connected to the top by hinges 416. An o-ring and circular seal 418 is positioned about the opening to securely close and seal the access opening. The cover or top has a vent or descecant 417 (FIG. 5) to maintain the atmospheric pressure within the interior of the fresh catalyst container. Because the fresh catalyst may be hydroscopic and can readily absorb moisture, the descecant has a moisture absorber 419 to prevent moisture from entering the fresh catalyst container.

Figure 11:
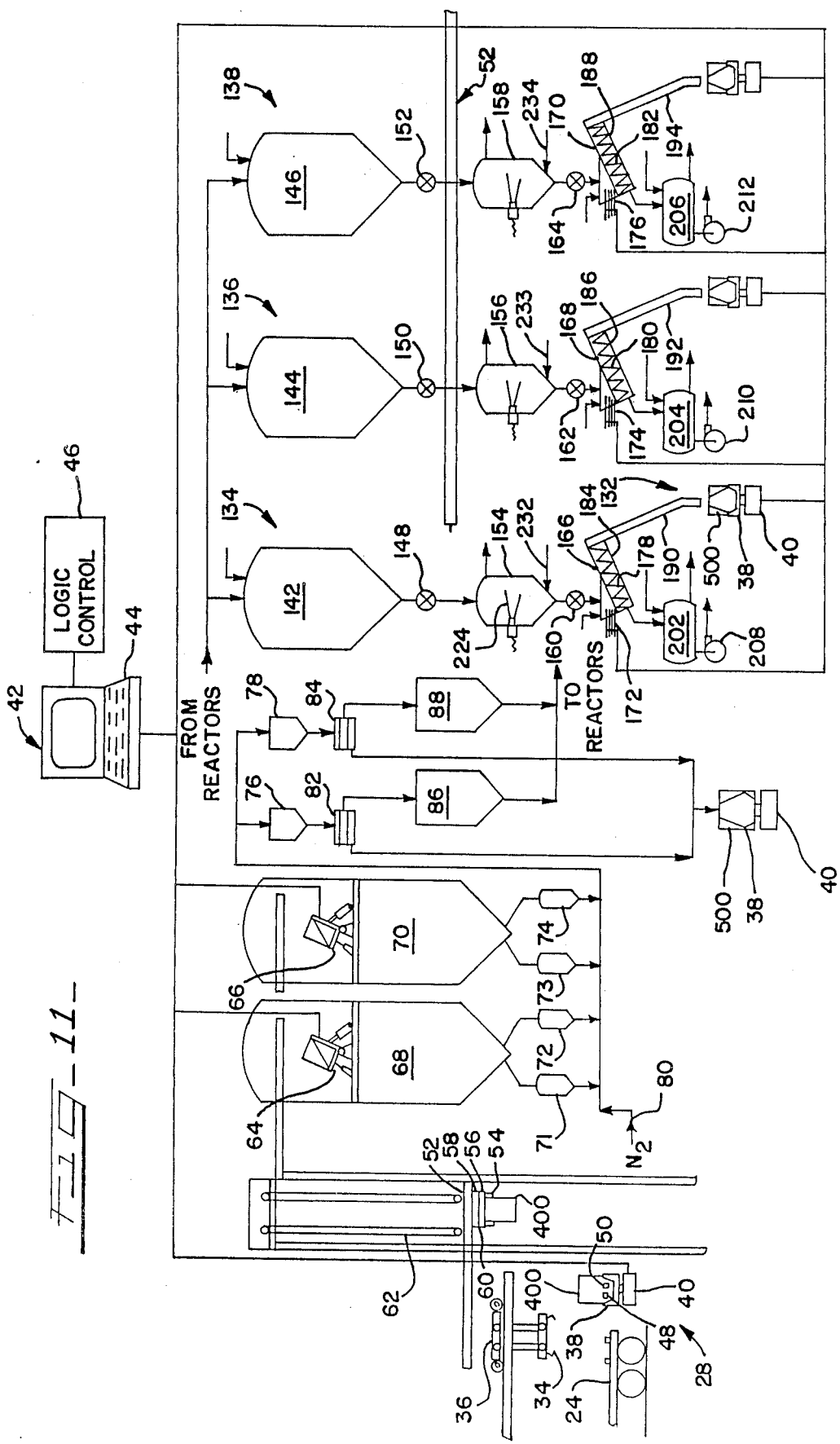
FIG. 11 is a flow diagram of part of the catalyst handling system and associated equipment.

One of the lateral sides 404 (FIG. 4) has an outlet opening and discharge port 420 in proximity to the bottom 408 for discharge of fresh catalyst when the sidewall is tilted downwardly, such as with a tilt mechanism and dumping or discharge assembly 64 or 66 (FIGS. 11 and 12). The lateral sidewall 404 also has a rectangular side door or closure flap 422 that is pivotally connected to the sidewall by hinges 424 about the outlet opening 420 to cover and close the outlet opening. The side door has an interior pivotable latch and locking mechanism 426 (FIG. 5), is radially connected to a bolt 428 (FIG. 4), and has an outwardly-facing exterior, hexagonal bolt head 430. The bolt head matingly receives a power-driven, rotatable socket arm 65 (FIG. 12) of the tilting mechanism 64. The tilting mechanism is connected to the computer and has a motor-driven piston 67 for tilting the intelligence pad 38 and framework 69 about a fixed pivot post or leg 75 to tilt the fresh catalyst container at an angle of discharge ranging from 30° to 75° to empty (dump) the contents (fresh catalyst) of the container into the inventory silo 68 or 70 after the door of the container has been opened by the computer-connected, rotatable socket arm 65. After the contents of the fresh catalyst container have been discharged, the rotatable socket arm closes the door and the tilting mechanism returns the emptied fresh catalyst container to its initial, normally horizontal position for transport via the monorail and lift elevator to the staging area facility and complex.

The fresh catalyst container has downwardly sloping, truncated, frustro-conical, interior wall portions, false corners or baffles 432 and 434 (FIG. 5) which extend inwardly from the upright walls at an angle ranging from 35° to 50° toward the side door 422 to deflect and facilitate discharge (unloading) or fresh catalyst through the outlet opening.

Four castings or legs 436 (FIG. 4) provide lock-receiving mechanisms which extend downwardly from the bottom corners of the fresh catalyst container to matingly engage and lockably receive cylindrical pins of a flatbed truck trailer in order to secure the fresh catalyst container to the flatbed truck trailer during transport by truck.

A pair of open ended, parallel rectangular, tubular beams 438 and 440 (FIG. 1) provide lower forklift channels which extend laterally across and are mounted against the bottom of the fresh catalyst container. The forklift channels extend between and connect the front and back walls of the container and extend downwardly from the bottom of the container to receive the tines (forks) of a forklift truck. The forklift channels accommodate transport of the fresh catalyst container by forklift truck onto and off of flatbed truck trailers and railway cars. Triangular reinforcing plates or gussets 439 can be mounted to both upright sides of the forklift channels and to the underside of the bottom to reinforce and support the forklift channels and provide a protection barrier to minimize accidental damage by the tines of a forklift truck.

The front and back walls of the container have wall portions or grab-hook channel plates 442 and 444 (FIGS. 1, 3, and 4) positioned adjacent to the top corners which provide pentagon-shaped, monorail- and bridge crane-grab channels, recesses or openings 446 and 448. The mono-rail- and bridge crane-grab channels extend laterally through the front and back walls to alternatively receive the grab hooks 54 (FIG. 2) of a monorail transport carrier 56 of an overhead monorail trolley 58 and the grab hooks 34 (FIG. 11) of a bridge crane 36 to facilitate transport by both a monorail 52 and a bridge crane 36.

A longitudinally extending, catalyst-indicating, limit switch-tripping pin or detent 450 or 452 (FIG. 4) is operatively connected to the front wall adjacent to the bottom to engage a limit switch 50 or 51 (FIGS. 1 and 3) on an upright switch board 53 near the bottom of the intelligence pad 38 to indicate the presence and type of fresh catalyst stored in the container. The pin is preferably elongated and cylindrical. In practice, only one pin is attached to the fresh catalyst container. The catalyst-indicating pin can be operatively attached to the container at the catalyst manufacturing facility or supply house or at other locations.

A demetallation catalyst-indicating pin 450 (FIG. 4) indicates that a demetallation catalyst has been loaded into the fresh catalyst container. A desulfurization catalyst-indicating pin 452 indicates that a desulfurization catalyst has been loaded into the fresh catalyst container. The demetallation catalyst-indicating pin 450 is positioned to extend from the container at a location to engage and trip a demetallation catalyst-limit switch 50 (FIGS. 1 and 3) extending inwardly and positioned near the bottom of the intelligence pad 38. The desulfurization catalyst-indicating pin 452 extends outwardly from the fresh catalyst container at a location to engage and trip a desulfurization catalyst-limit switch 51 extending inwardly and at a location near the bottom of the intelligence pad.

A circular visible display marker 454 (FIGS. 1 and 3), badge, coating, or indicator is marked and attached to the exterior surface of at least one of the upright walls, preferably to all four of the upright walls, in proximity to the top to visually indicate the type of fresh catalyst stored in the container. Preferably, one color, such as red, indicates a demetallation catalyst and another color, such as gold, indicates a desulfurization catalyst. The visual display indicators are placed on the exterior vertical walls of the fresh catalyst container at the catalyst manufacturing facility or supply house or at other locations, if desired. The visual indicator can be visually observed by the unit superintendent and the operators in order to quickly visually identify the type of catalyst contained within the sealed fresh catalyst container.

As shown in FIG. 1, the intelligence pad 38 has a rectangular base 39 which is bolted or otherwise secured to the floor of the staging area facility and complex. The base comprises a rectangular periphery of elongated rails or beams. A horizontal rectangular weigh scale 40 is positioned within the interior of the base and is bounded by interior rectangular upright rails 41 or beams. The interior rails are positioned inwardly of and extend above the outer peripheral rails 39 to engage, receive, and support the bottom forklift channels of the fresh catalyst container 400 and the spent catalyst container 500. The interior beams transfer the load and weight of the containers to the weigh scale. The weigh scale is connected by wires to the logic control board 46 (FIG. 11) and computer 44 of the central processing unit 42.

Extending upwardly from each of the corners of the outer rails of the base is a vertical L-shaped post and guide rail 43 (FIG. 1). The post and guide rails guide, receive, and support the bottom corners and legs of the fresh catalyst container. The posts and guide rails have truncated, outwardly flared tops 45 to facilitate entry of the bottom corners and legs of the container, as well as to guide the container onto the intelligence pad.

An upright limit switch-support board 53 (FIGS. 1 and 3) extends upwardly from the front rail of the base. The demetallation catalyst-limit switch 50 and desulfurization catalyst-limit switch 51 are mounted upon and extend longitudinally inward from the support board to engage the catalyst-indicating pins 450 and 452 of the fresh catalyst container. The limit switches are connected by wires to the logic control board 46 (FIG. 11) and the computer 44 of the central processing unit 42.

When the fresh catalyst container is positioned upon the intelligence pad, the weigh scale will determine the weight of the loaded catalyst container and the catalyst-indicating pin will trip the corresponding limit switch. The catalyst-handling system, therefore, electronically senses the type of fresh catalyst (demetallation or desulfurization) within the interior of the sealed fresh catalyst container depending on which catalyst-indicating pin and limit switch have been engaged and tripped. Simultaneously, the system also electronically detects the weight of the fresh catalyst container and compares that weight with the previously inputed weight of a fully loaded container of fresh demetallation catalyst and a fully loaded container of fresh desulfurization catalyst, to electronically determine the type of fresh catalyst loaded in the interior of the fresh catalyst container.

In the preferred embodiment, the tilting mechanisms and dumping assemblies 64 and 66 (FIGS. 11 and 12) are pivotally mounted upon another similar intelligence pad 38. In this manner, the catalyst handling system can further electronically detect and sense the type of catalyst contained in the container before the fresh catalyst is dumped (discharged) into one of the inventory silos below the tilting mechanism assembly. This serves as a further safety control for the system.

In operation, as shown in FIG. 6, fresh hydrotreating catalyst is loaded in fresh catalyst containers, bins, or vessels 400 at a catalyst manufacturing facility 20 or supply house 22 and transported by flatbed truck 24 and railroad 26 to a staging area complex facility and warehouse 28 of an oil refinery 30 surrounded by aboveground tanks 32. The fresh catalyst containers are unloaded and removed from the flatbed trucks at the staging area facility by grab hooks 34 (FIG. 11) of a mobile bridge crane 36 and placed on an intelligence pad 38 where it is weighed by a weight scale 40 that is operatively connected to a central processing unit 42 comprising a computer 44 and a logic control board 46. The weight scale and central processing unit cooperate and interface with each other to determine whether the containers are empty or partially or fully filled with fresh or spent catalyst. A catalyst indicating pin 48 extending from the base of the fresh catalyst container engages a limit switch 50 on the intelligence pad, which is also operatively connected to the central processing unit, to electronically detect the type of catalyst contained in the fresh catalyst bin.

The fresh catalyst bin is then lifted off the intelligence pad and raised to the underside of an overhead monorail 52 (FIGS. 1 and 11) by the grab hooks 54 of a monorail transport carrier 56. The monorail transport carrier is operatively connected to the monorail trolley 58 by cable 60. The trolley and the grab hooks are operatively connected to the central processing unit and are remotely and automatically controlled. The trolley and grab hooks also have manual override safety controls.

Each fresh catalyst container is carried by the overhead monorail from the staging area facility to a remote control, computerized lift elevator 62 (FIG. 11). The lift elevator raises the fresh catalyst container to a tilting mechanism and discharge assembly 64 or 66, via a monorail spur, where the fresh catalyst contents of the bin are dumped into one of two fresh catalyst silos 68 or 70 depending on the type (composition) of the catalyst. The empty fresh catalyst containers are returned to the staging area, catalyst vendors and suppliers by reversing the above procedure.

The fresh catalyst is pneumatically conveyed from the silo through pneumatic transfer vessels 71-74 to a surge hopper 76 or 78 with nitrogen gas from nitrogen gas injectors 80. Smaller particles of the fresh catalyst are removed by vibrating screens 82 or 84. Larger particles of fresh catalyst are passed to a storage hopper 86 or 88 from which they are fluidly conveyed to the reactors of a resid hydrotreating unit (RHU) by a heavy vacuum gas oil slurry.

As best shown in FIG. 7, each resid hydrotreating unit 90, 92 and 94 is a reactor train comprising a cascaded series or set of three ebullated bed reactors 96, 97 and 98. Hydrogen is injected into the ebullated bed reactors through feed line 100. A relatively high sulfur resid or sour crude is fed to the reactor where it is hydroprocessed (hydrotreated) and ebullated in the presence of the fresh and/or equilibrium catalyst and hydrogen to produce an upgraded effluent product stream leaving spent catalyst. As used throughout this patent application, the term "equilibrium catalyst" means a fresh catalyst which has been partially or fully used. The term "spent catalyst" as used in this patent application comprises equilibrium catalyst which has been withdrawn from the reactor. Hydroprocessing in the RHU includes demetallation, desulfurization, and hydrocracking. Hydroprocessing can convert most of the feedstock to lighter more valuable products, such as gasoline, distillates, catalytic cracker feed, and petrochemical feedstocks. The remaining portion of the products can be charged to cokers.

The resid hydrotreating units and associated refining equipment of FIG. 7 comprise three identical parallel trains of cascaded ebullated bed reactors 90, 92 and 94, as well as hydrogen heaters 101, influent oil heaters 102, an atmospheric tower 103, a vacuum tower 104, a vacuum tower oil heater 105, a hydrogen compression area 106, oil preheater exchangers 107, separators 108, recycled gas compressors 109, flash drums 110, separators 111, raw oil surge drums 112, sponge oil flash drums 113, amine absorbers and recycle gas suction drums 114, and sponge absorbers and separators 115.

Each of the reactor trains comprises three ebullated bed reactors in series. The feed typically comprises resid. Recycle gas can also be injected into the reactors along with the hydrogen gas. Demetallation primarily occurs in the first ebullated bed reactor in each train. Desulfurization primarily occurs in the second and the third ebullated bed reactors in each train. The effluent product stream typically comprises light hydrocarbon gases, hydrotreated naphtha, distillates, light and heavy gas oil, and unconverted resid. The hydrotreating catalyst typically comprises a hydrogenating component on a porous refractory, inorganic oxide support.

The resid hydrotreating unit is quite flexible and, if desired, the same catalyst can be fed to one or more reactors or a separate demetallation catalyst can be fed to the first reactor while a desulfurization catalyst can be fed to the second and/or third reactors. Alternatively, different catalysts can be fed to each of the reactors. The used spent catalyst typically contains or is covered with nickel, sulfur, vanadium and carbon (coke). As much as 50 tons of catalyst are transported into, out of, and replaced in the ebullated bed reactors daily.

In use, fresh hydrotreating catalyst is fed downwardly into the top of the first ebullated bed reactor 96 (FIG. 8) through the fresh catalyst feed line 118. Hot resid feed and hydrogen enters the bottom of the first ebullated bed reactor 96 (FIG. 8) through feed line 100 and flows upwardly through a distributor plate 119 into the fresh catalyst bed 120. The distributor plate contains numerous bubble caps 121 and risers 122 which help distribute the oil and the gas generally evenly across the reactor. An ebullating pump 123 circulates oil from a recycle pan 124 through a downcomber 125 and the distributor plate 119. The rate is sufficient to lift and expand the catalyst bed from its initial settled level to its steady state expanded level. The effluent product stream of partially hydrotreated oil and hydrogen-rich gases are withdrawn from the bottom of the reactor through effluent product line 126. The used spent catalyst is withdrawn from the top of the reactor through spent catalyst discharge line 127. The spent catalyst typically contains deposits of metals, such as nickel and vanadium, which have been removed from the influent feed oil during hydrotreating.

Catalyst particles are suspended in a two-phase mixture of oil and hydrogen rich gas in the reaction zone of the reactor. Hydrogen gas typically continually bubbles through the oil. The random ebullating motion of the catalyst particle results in a turbulent mixture of the three phases which promotes good contact mixing and minimizes temperature gradients.

The cascading of the ebullated bed reactors in a series of three per reactor train, in which the effluent of one reactor serves as the feed to the next reactor, greatly improves the catalytic performance of the backmixed ebullated bed process. Increasing the catalyst replacement rate increases the average catalyst activity.

As shown in FIGS. 9 and 10, the partially hydrotreated effluent of the first ebullated bed reactor 96 comprises the influent feed of the second ebullated bed reactor 97. The partially hydrotreated effluent of the second ebullated bed reactor 97 is the influent feed of the third ebullated bed reactor 98. The second and third reactors are functionally, operatively, and structurally similar to the first reactor and cooperate with the first reactor to effectively hydrotreat and upgrade the influent feed oil. Quench liquid (oil) and/or vapor can be injected into the influent feeds of the second and third reactors through quench lines 128 and 129 (FIG. 10) to cool and control the bulk temperatures in the second and third reactors. Fresh catalyst can be fed into the top of all the reactors, although for process efficiency and economy it is preferred to utilize catalyst staging by feeding fresh catalyst into the first and third reactors through fresh catalyst feed lines 100 and 130 (FIG. 9) and by feeding recycled spent catalyst from the third reactor into the second reactor through recycle catalyst line 131. For best results, the catalyst is fed downwardly into the ebullated bed reactor in countercurrent flow relationship to the influent oil and hydrogen feed. Used spent catalyst are discharged from the reactor through spent catalyst discharge lines 127 and 127'.

Preferably, vacuum resid is heated in the oil heater 102 (FIG. 7) and hydrogen is heated in the hydrogen heater 101 before being combined and fed through the feed line 100 into the first reactor, for process efficiency. The effluent product streams can be withdrawn from the bottoms or tops of the reactors, as preferred.

The fluid state of the ebullated hydrotreating catalyst enhances the flexibility of the ebullated bed reactors and permits the addition or withdrawal of oil slurry and catalyst without taking the reactors off-stream. Daily catalyst replacement results in a steady state equilibrium catalyst activity.

Products are withdrawn from the bottom or top of the third reactor 98 and are separated into fractions of oil and gas in the towers and other processing equipment previously described.

The ebullated bed reactors are capable of handling atmospheric and vacuum resids from a wide range of sour and/or heavy crudes. Such crudes can have a gravity as much as 20° API, a sulfur content up to 8% by weight, and a substantial amount of nickel and vanadium. The ebullated bed reactors typically operate at a temperature above 700° F and at a hydrogen partial pressure greater than 1500 PSIA.

Ebullated bed reactors have many advantages over fixed bed reactors. They permit operation at higher average temperatures. They permit the addition and withdrawal of catalyst without necessitating shutdown. They avoid plugging due to dirty feed.

Since the liquid resid feed does not usually have enough velocity to expand the catalyst bed above its settled level, recycle is recycled from the top of the reactor to the bottom of the reactor through a downcomer pipe and then pumped back up through the reactor at a sufficient velocity to attain the required degree of expansion.

The products produced from the resid hydrotreating units in the ebullated bed reactors include light hydrocarbon gases, light naphtha, heavy naphtha, light distillate, mid-distillate, diesel oil, light vacuum gas oil, heavy vacuum gas oil, and 1000+° F resid. The light hydrocarbon gases and light naphtha can be fed into a vapor recovery unit. Heavy naphtha can be sent to a reformer. The mid-distillate oil is useful for producing diesel fuel and No. 2 furnace oil, as well as for conveying and/or cooling the spent catalyst. Light and heavy vacuum gas oils are useful as feedstock for a catalytic cracker. The 1000+° F resid can be sent to cokers to produce coke.

After the fresh hydrotreating catalyst has been used to hydrotreat and upgrade the influent feed oil, the spent equilibrium catalyst is removed and loaded into spent catalyst containers, bins, or vessels 500 (FIG. 11) on other intelligence pads 38. The spent catalyst containers are lifted from the intelligence pads at the deoiling station and spent catalyst-loading zone 132 to the spent catalyst return section 134 of the overhead monorail 52 by the grab hooks 54 of the monorail transport carrier 56. The spent catalyst containers are transported, carried, and returned by the overhead monorail to the staging area complex 28 where the containers are loaded onto a flatbed truck and shipped to a reclamation site or disposal facility for reclamation and/or disposal of the spent catalyst. The empty spent catalyst containers are returned to the deoiling station by reversing the above procedure.

In order to increase product yield and prevent reactor oil from spilling and dripping from the spent catalyst container onto the nation's highways, the spent catalyst is substantially deoiled before being loaded into the spent catalyst containers. To this end, special deoiling equipment 134, 136 and 138 (FIG. 11) comprising a deoiling system is operatively connected and positioned downstream of the resid hydrotreating units 90, 92 and 94 (FIGS. 6 and 7). The deoiling equipment includes a high pressure transfer vessel, spent catalyst inventory vessels 142, 144 and 146 (FIG. 11), inventory flow valves 148, 150 and 152, cooling drums or vessels 154, 156 and 158, cooling drum-outlet valves 160, 162 and 164, spiral classifiers 166, 168 and 170 having inlet feedhoppers 172, 174 and 176 and screw conveyors 178, 180 and 182 positioned at an incline within screw-conveyor housing-sections 184, 186 and 188, swingable (pivotable) spiral discharge chutes 190, 192 and 194 pivotally connected to the top of the housing-sections of the spiral classifiers, intelligence pads 38 with upright guide posts for holding spent catalyst containers, weigh scales 40 at the bottom of the intelligence pads operatively connected to the logic control board 46 and computer 44 of the central processing unit 42, a water-cooled heat exchanger or water cooler, a water cooler-inlet valve, a cooling drum inlet valve, one or more surge drums 202, 204 and 206, recycle centrifugal pumps 208, 210 and 212 and various interconnecting transfer lines, pipes, and conduits. A motor rotatably drives the screw conveyors of the spiral classifiers.

The first reactor 96 (FIG. 9) is operatively associated with and connected to the deoiling equipment, as well as to a pair of intelligence pads 38 (FIG. 11). The second and third reactors 97 and 98 are each operatively associated and connected to similar deoiling equipment such as those shown downstream of vessels 144 and 146, respectively (FIG. 11).

In the deoiling process, a slurry of spent catalyst and effluent reactor oil is withdrawn from the ebullated bed reactors and fed through a spent catalyst slurry line to the high-pressure catalyst-transfer vessel where it is cooled to a temperature above the 165° F flashpoint of mid-distillate diesel oil, preferably to about 180° F. The cooled slurry is withdrawn from the transfer vessel through a discharge line and conveyed with some mid-distillate diesel oil to the spent catalyst inventory vessel 142 (FIG. 11). The slurry is withdrawn from the inventory vessel 142 and gravitated to the cooling drum 154 via control valve 148. Positioned within the interior of the cooling drum is a vibrating tuning fork probe 224 which is operatively connected to the central processing unit. The vibrating tuning fork probe electronically detects the presence or absence of spent catalyst and controls the amount of spent catalyst in the cooling drum. When the amount of spent catalyst sensed by the vibrating tuning fork probe has reached a preselected level, the flow of slurry from the inventory vessel 142 into the cooling drum 154 is blocked and stopped by control valve 148 operatively connected to the vibrating tuning fork probe and the central processing unit. The tuning fork probes and the cooling drum also serve as safety controls to electronically close their associated cooling drum valve when about 250 cubic feet of catalyst slurry has filled the cooling drum to avoid overloading and damaging the spiral classifier.

The slurry of catalyst and oil in the cooling drum 154 (FIG. 11) is cooled to a temperature below the flashpoint of the mid-distillate diesel oil, preferably to about 130° F. The cooling of the slurry is accomplished in the cooling drum by circulating and pumping a cooling oil comprising cooled mid-distillate diesel oil from oil lines 232-234 in direct heat exchange contact with the slurry in the cooling drum. The effluent cooling oil is withdrawn from the cooling drum through effluent oil lines and circulated through the water-cooled heat exchanger where the effluent cooling oil is cooled. The cooled effluent oil is passed from the heat exchanger to the spent catalyst surge drum 202.

The cooled slurry from the cooling drum 154 (FIG. 11) is conveyed by gravity flow to the feedhopper 172 of the spiral classifier 166. The cooled slurry is spirally conveyed from the feedhopper with the rotating screw conveyor blades 178 of the spiral classifier at an upward angle of inclination ranging from 15° to 60°. As this occurs, a substantial amount of the mid-distillate diesel oil from the spent catalyst is removed and drained to substantially deoil the spent catalyst. The removed oil is conveyed by gravity flow at a downward angle of inclination, generally opposite the angle of inclination of the screw conveyor 178, through the clearance around the circumference of the screw conveyor blades 178 along with the bottom interior surface of the screw-conveyor housing-section 184. The removed oil flows in a general countercurrent flow relationship to the upwardly conveyed catalyst slurry.

Preferably, the feedhoppers 172, 174, and 176 (FIG. 11) are blanketed with nitrogen to remove hydrocarbon gases so as to enhance operator safety. A nitrogen purge can be injected into the inventory vessels 142, 143 and 144 to attain the desired pressure and help prevent oxygen from entering the inventory vessel 142.

The flow of deoiled catalyst is directed and dispensed at a downward angle of inclination by gravity from the top of the spiral classifier 166, 168, or 170 (FIG. 11) through the discharge chute 190, 192, or 194 into the top of a first spent catalyst container 500. The weight of the spent catalyst container is continuously sensed through the weigh scale 40 while the deoiled catalyst is fed into the spent catalyst bin. The weigh scale is operatively connected via the central processing unit to the motor of the spiral classifier and optionally to cooling drum valve 160, 162, or 164. The weigh scale, in cooperation with the central processing unit, de-energizes and stops the motor and optionally activates the flow valve to stop, shut off, and block the flow of deoiled catalyst into the container when the container being loaded with spent catalyst has reached a preselected weight. Thereafter, the discharge chute is pivoted to a position above the second spent catalyst container and the deoiled catalyst is directed and dispensed through the discharge chute into the second spent catalyst container in a similar manner.

As the spent catalyst containers are filled to their desired weights, the tops of the containers are closed with a closure lid or cap. The spent catalyst containers are then grasped and lifted by the grab hooks 54 (FIG. 11) of the monorail transport carrier 56 and raised to the trolley 58 of an overhead monorail 52 where they are transported to the staging area complex facility 28. At the staging area complex facility, the filled spent catalyst containers are loaded onto flatbed truck trailers 24 by a bridge crane 36 and transported by flatbed truck to the reclamation site.

The above resid hydrotreating units and fresh catalyst containers have been built, constructed, and extensively tested in the Amoco Oil Company Refinery at Texas City, Tex. The resid hydrotreating units and fresh catalyst containers commenced commercial operations within the past year and produced unexpectedly good results. The resid hydrotreating units have been commercially successful to process and upgrade substantial quantities of sour crude and resid into gasoline and other valuable petroleum products in order to decrease America's dependence on foreign oil from Saudi Arabia, Nigeria, etc. The spent catalyst containers have been commercially successful to efficiently and safely transport fresh hydrotreating catalyst to ebullated bed reactors of resid hydrotreating units.

Although embodiments of this invention have been shown and described, it is to be understood that various modifications and substitutions, as well as rearrangements of parts, components, equipment, and/or process steps, can be made by those skilled in the art without departing from the novel spirit and scope of this invention.

What is claimed is:

1. A fresh catalyst container, comprising:

generally upright walls including substantially parallel sidewalls and substantially parallel front and back walls, said front and back walls extending between and connecting said sidewalls, said upright walls intersecting and cooperating with each other to define upright edges;

substantially parallel top and bottom walls extending between, intersecting, and connecting said upright walls and cooperating with said upright walls to define corners of said container;

said walls comprising substantially solid catalytically resistant metal and cooperating with each other to provide an impervious enclosure for containing fresh catalyst;

said top wall defining an inlet opening for ingress of said fresh catalyst and having a lid for closing said inlet opening;

one of said sidewalls defining an outlet opening in proximity to said bottom wall for egress of said fresh catalyst when said container is tiled and having closure means operatively connected to said one sidewall for closing said outlet opening;

lock-receiving means comprising legs extending downwardly from aid bottom for matingly engaging and lockingly receiving lock pins of a flatbed truck trailer;

lower forklift channels extending across and secured to said bottom wall for receiving tines of a forklift truck, said truck forklift channels being positioned at a height below all the corners of said container;

upper monorail grab channels extending through said front and back walls for receiving grab hooks of a monorail, said upper monorail grab channels being spaced above said lower forklift channels, said upper monorail grab channels being spaced from edges of said container;

said upper monorail grab channels and said lower forklift channels extending in substantially the same direction and being substantially parallel to each other; and substantially horizontal electrical limit switch-tripping means operatively connected to said walls for indicating the type of fresh catalyst in said container.

2. A fresh catalyst container, comprising:

substantially rigid, rectangular upright walls including substantially parallel longitudinal walls and substantially parallel lateral walls extending between and connecting said longitudinal walls;

substantially rigid rectangular horizontal end walls including a top and a bottom extending between and connecting said upright walls;

said walls comprising substantially rigid imperforate barriers of catalytic-resistant metal and cooperating with each other to provide upright edges and a substantially impervious enclosure for containing fresh catalyst;

outwardly facing external wear plates extending along aid upright walls in proximity to said bottom for reinforcing and protecting said upright walls;

said top defining an access opening for input of fresh catalyst and having a lid for sealing closed said access opening;

one of aid lateral walls defining an outlet opening in proximity to said bottom for discharge of said catalyst when said one lateral wall is tilted downwardly and having a door hingeably connected to said one lateral wall for closing said outlet opening, said door including latch means for locking said door and socket-engaging bolt means for moving said latch means from a locked to an unlocked position and vice versa upon rotational and mating engagement of a socket arm;

downwardly truncated interior wall portions extending inwardly from said longitudinal walls generally towards said door for facilitating discharge of catalyst through said outlet opening;

legs comprising pin-receiving castings extending downwardly from said bottom for engagably receiving pins of a flatbed truck trailer;

laterally extending forklift channels extending downwardly from said bottom for receiving tines of a forklift truck, said forklift channels being positioned transverse to and slightly below said socket-engaging bolt means of said door;

monorail- and bridge crane-grab, substantially pentagon-shaped channels extending laterally through said longitudinal walls in proximity to said top for alternately receiving the grab hooks of a monorail and the grab hooks of a bridge crane-transport carrier to facilitate transport by both a monorail and a bridge crane, said pentagon-shaped, monorail- and bridge crane-grab channels extending in a direction substantially parallel to and above said forklift channels; and a catalyst-indicating limit switch-tripping pin operatively connected to one of said longitudinal walls adjacent to said bottom and extending outwardly of said wear plates for engaging a limit switch operatively associated with a weight scale and pad to indicate the presence and type of fresh catalyst contained in said container, said catalyst-indicating limit switch-tripping pin extending in a direction substantially transverse to said socket-engaging bolt means of said door and substantially parallel to both said forklift channels and said pentagon-shaped, monorail- and bridge crane-grab channels.

3. A catalyst container in accordance with claim 2 wherein said pin comprises a desulfurization catalyst-indicating pin.

4. A catalyst container in accordance with claim 2 wherein said pin comprises a demetallation catalyst-indicating pin.

5. A catalyst container in accordance with claim 4 further including a circular visible demetallation catalyst-indicator on said lateral wall above said door for indicating the presence of a demetallation catalyst in said container.

* * * * *

UNITED STATES PATENT OFFICE
CERTIFICATE OF CORRECTION

Patent No. 4,946,068                    Dated August 7, 1990

Inventor(s) Michael E. Erickson, Roman T. Plichta

It is certified that error appears in the above-identified patent and that said Letters Patent is hereby corrected as shown below:

| Col. | Line  |                                              |
|------|-------|----------------------------------------------|
| 12   | 53    | "truck" should read --lower--                |
| 12   | 59-60 | "from edges" should read --from said edges-- |
| 13   | 20    | "aid" should read --said--                   |

Signed and Sealed this

Eighth Day of December, 1992

Attest:

DOUGLAS B. COMER

*Attesting Officer*       Acting Commissioner of Patents and Trademarks